(12) United States Patent
Kawano

(10) Patent No.: US 10,586,348 B2
(45) Date of Patent: Mar. 10, 2020

(54) DISTANCE MEASUREMENT DEVICE AND IMAGE CAPTURING CONTROL DEVICE

(71) Applicant: CANON KABUSHIKI KAISHA, Tokyo (JP)

(72) Inventor: Fujio Kawano, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 241 days.

(21) Appl. No.: 15/684,739

(22) Filed: Aug. 23, 2017

(65) Prior Publication Data
US 2018/0061075 A1 Mar. 1, 2018

(30) Foreign Application Priority Data
Aug. 30, 2016 (JP) ................. 2016-168611

(51) Int. Cl.
*G06T 7/70* (2017.01)
*G06T 7/73* (2017.01)
*G06T 7/60* (2017.01)
*H04N 5/232* (2006.01)

(52) U.S. Cl.
CPC ............. *G06T 7/70* (2017.01); *G06T 7/60* (2013.01); *G06T 7/73* (2017.01); *H04N 5/23293* (2013.01); *G06T 2207/30252* (2013.01)

(58) Field of Classification Search
None
See application file for complete search history.

(56) References Cited

U.S. PATENT DOCUMENTS

| 6,670,912 | B2* | 12/2003 | Honda | G01S 7/412 |
| | | | | 180/168 |
| 2003/0185420 | A1* | 10/2003 | Sefcik | G06K 9/3241 |
| | | | | 382/103 |
| 2012/0213412 | A1* | 8/2012 | Murashita | G06T 7/50 |
| | | | | 382/104 |

FOREIGN PATENT DOCUMENTS

| JP | 2002-366936 A | 12/2002 |
| JP | 2006-313116 A | 11/2006 |
| JP | 2012-159469 A | 8/2012 |

* cited by examiner

*Primary Examiner* — Lindsay J Uhl
(74) *Attorney, Agent, or Firm* — Canon USA, Inc., IP Division

(57) ABSTRACT

A distance measurement device and an image capturing control device obtains height information and angle information on an image capturing unit based on a captured image signal output from an image capturing unit, and obtain distance information indicating a distance between the image capturing unit and a target object by using the height information and the angle information.

16 Claims, 12 Drawing Sheets

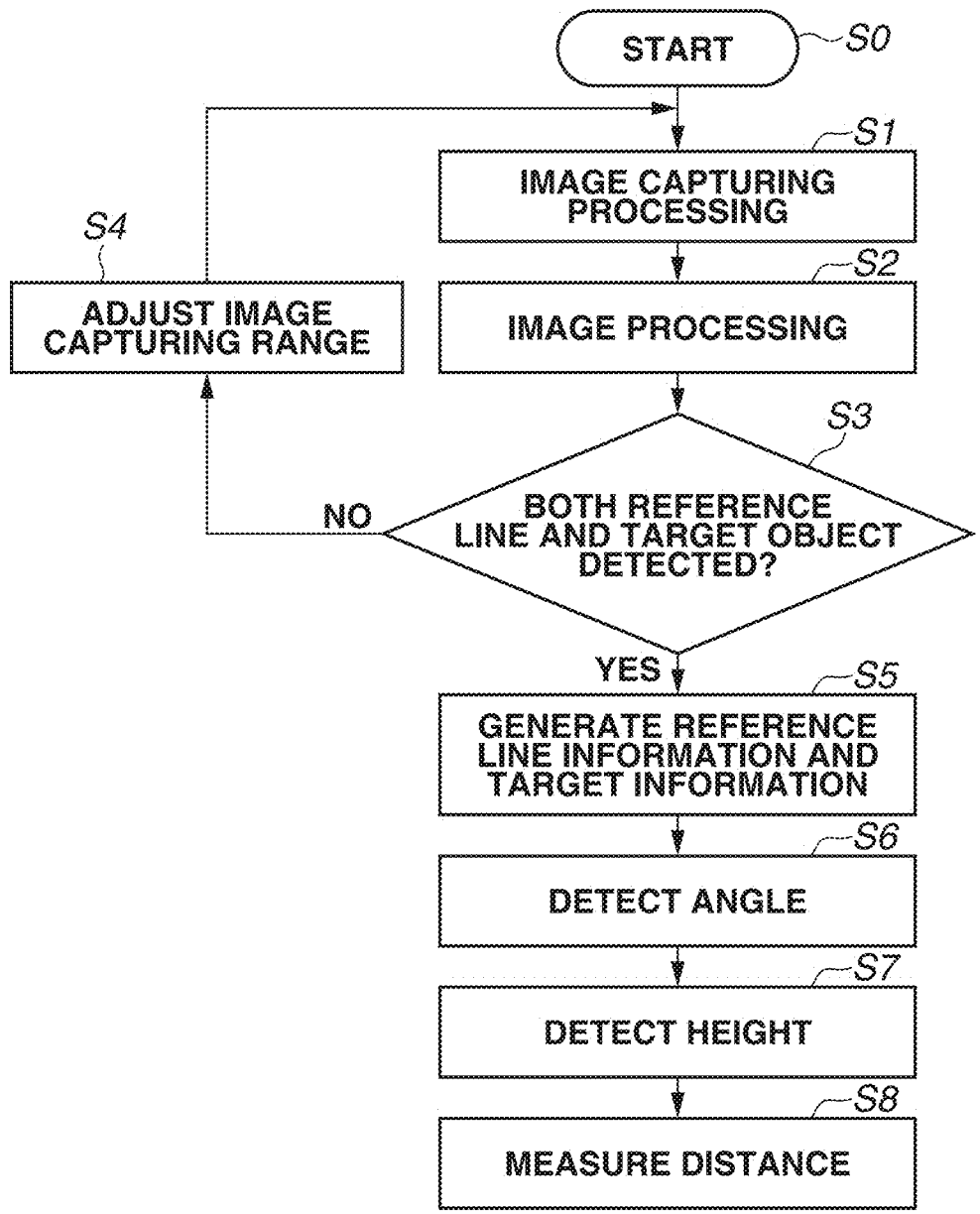

FIG.10B
FRONT VIEW
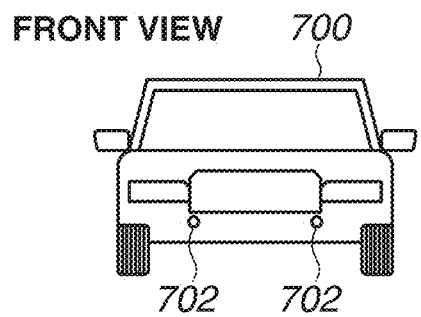
TOP VIEW
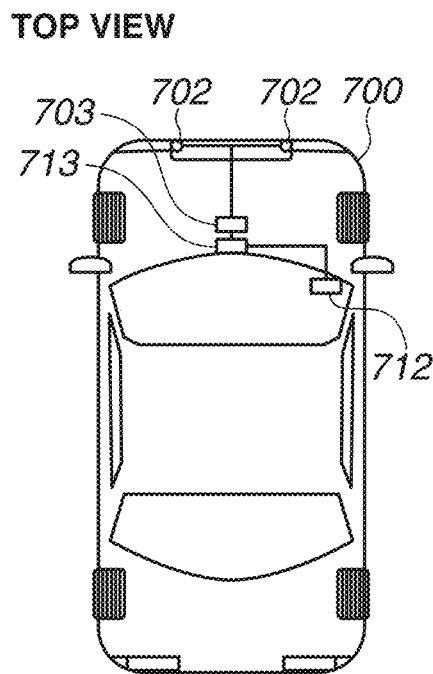
BACK VIEW
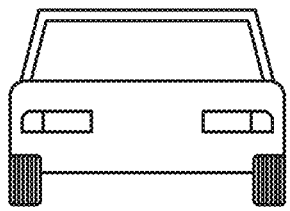

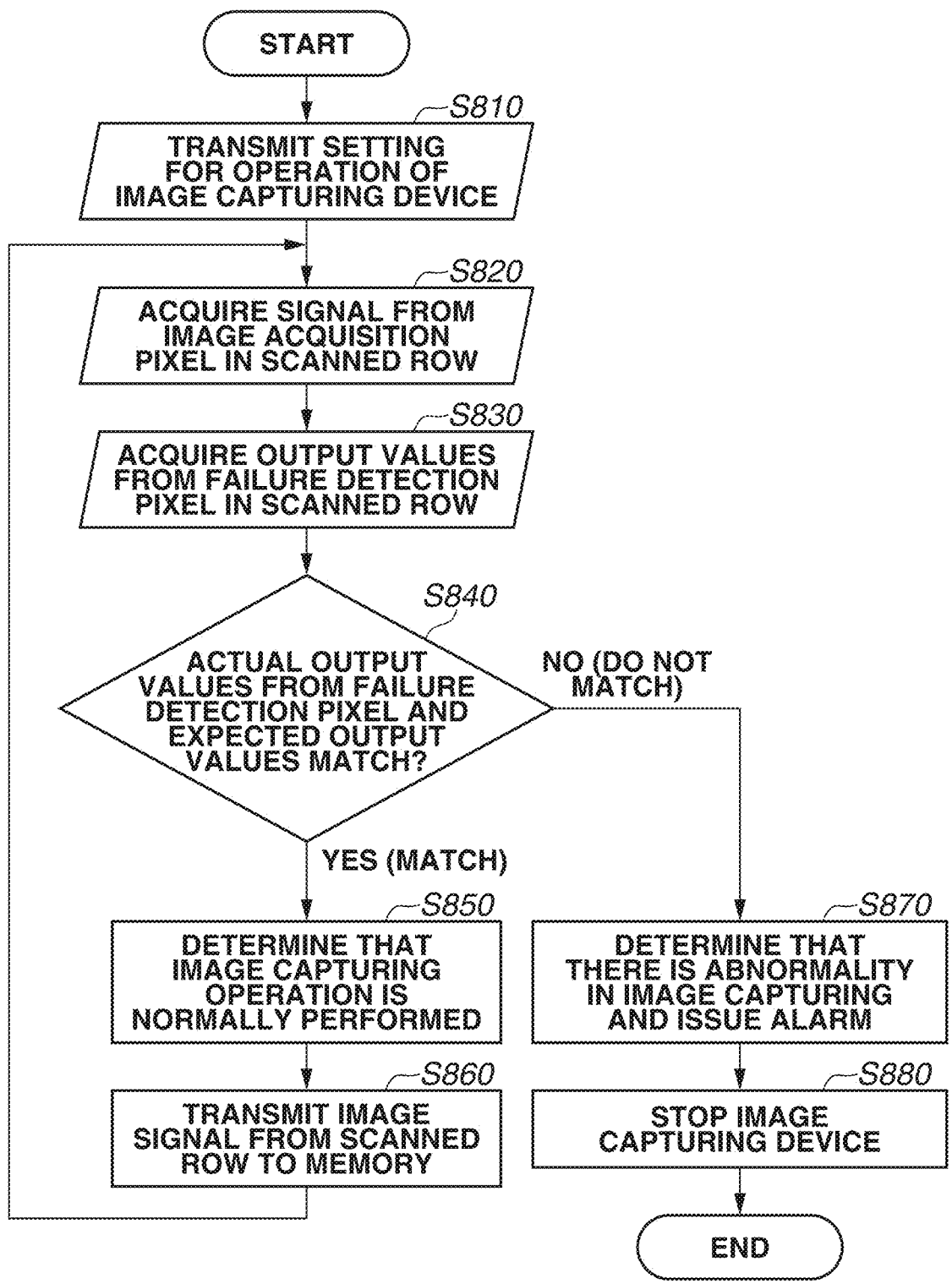

DISTANCE MEASUREMENT DEVICE AND IMAGE CAPTURING CONTROL DEVICE

BACKGROUND

Field of the Disclosure

The present disclosure generally relates to distance measurement and, more particularly, to a distance measurement device and an image capturing control device that measure a distance between an image capturing unit and a target object.

Description of the Related Art

Japanese Patent Application Laid-Open No. 2012-159469 and Japanese Patent Application Laid-Open No. 2002-366936 each discuss an example of a distance measurement device that measures a distance between an image capturing unit and a target object.

The distance measurement device discussed in Japanese Patent Application Laid-Open No. 2012-159469 detects a crosswalk, and measures the distance between the image capturing unit and a pedestrian by using the crosswalk as a reference.

The distance measurement device discussed in Japanese Patent Application Laid-Open No. 2002-366936 detects a direction of a curve of a lane mark near the skyline, from a shape of the lane mark. Then, the distance measurement device calculates a radius of curvature of the curve. Then, the distance measurement device measures the distance between the image capturing unit and the target object, based on the radius of curvature thus calculated.

The distance measurement device discussed in Japanese Patent Application Laid-Open No. 2012-159469 uses the crosswalk, a pattern of which has been known, as the reference. Thus, the distance measurement device discussed in Japanese Patent Application Laid-Open No. 2012-159469 is difficult to measure the distance in a situation where the known pattern is unavailable.

The distance measurement device discussed in Japanese Patent Application Laid-Open No. 2002-366936 can measure the distance when there is a lane mark in contact with the skyline. Thus, the distance measurement device discussed in Japanese Patent Application Laid-Open No. 2002-366936 is difficult to accurately measure the distance in a situation without the lane mark in contact with the skyline.

SUMMARY

According to one or more aspects of the present disclosure, a distance measurement device includes an image capturing unit and a calculation unit, wherein the image capturing unit is configured to output a captured image signal by capturing an image including a reference line extending in a horizontal direction and a target object positioned closer to the image capturing unit than the reference line, to the calculation unit, wherein the calculation unit is configured to obtain reference line angle information indicating an angle between a direction from the image capturing unit to the reference line and a height direction of the image capturing unit, by using the captured image signal, wherein the calculation unit is configured to obtain height information indicating a height at which the image capturing unit is provided, based on the reference line angle information, wherein the calculation unit is configured to obtain target object angle information indicating an angle between a direction from the image capturing unit to the target object and the height direction of the image capturing unit, by using the captured image signal, and wherein the calculation unit is configured to obtain distance information indicating a distance between the image capturing unit and the target object, by using the height information and the target object angle information.

Further features of the present disclosure will become apparent from the following description of exemplary embodiments with reference to the attached drawings.

BRIEF DESCRIPTION OF THE DRAWINGS

FIG. 2 is a flowchart illustrating an example of distance measurement processing.

FIGS. 10A and 10B are diagrams illustrating configurations of an image capturing system and a moving body.

FIG. 11 is a diagram illustrating processing executed by the image capturing system and the moving body.

DESCRIPTION OF THE EMBODIMENTS

Exemplary embodiments are described below with reference to the drawings.

Figure 1:
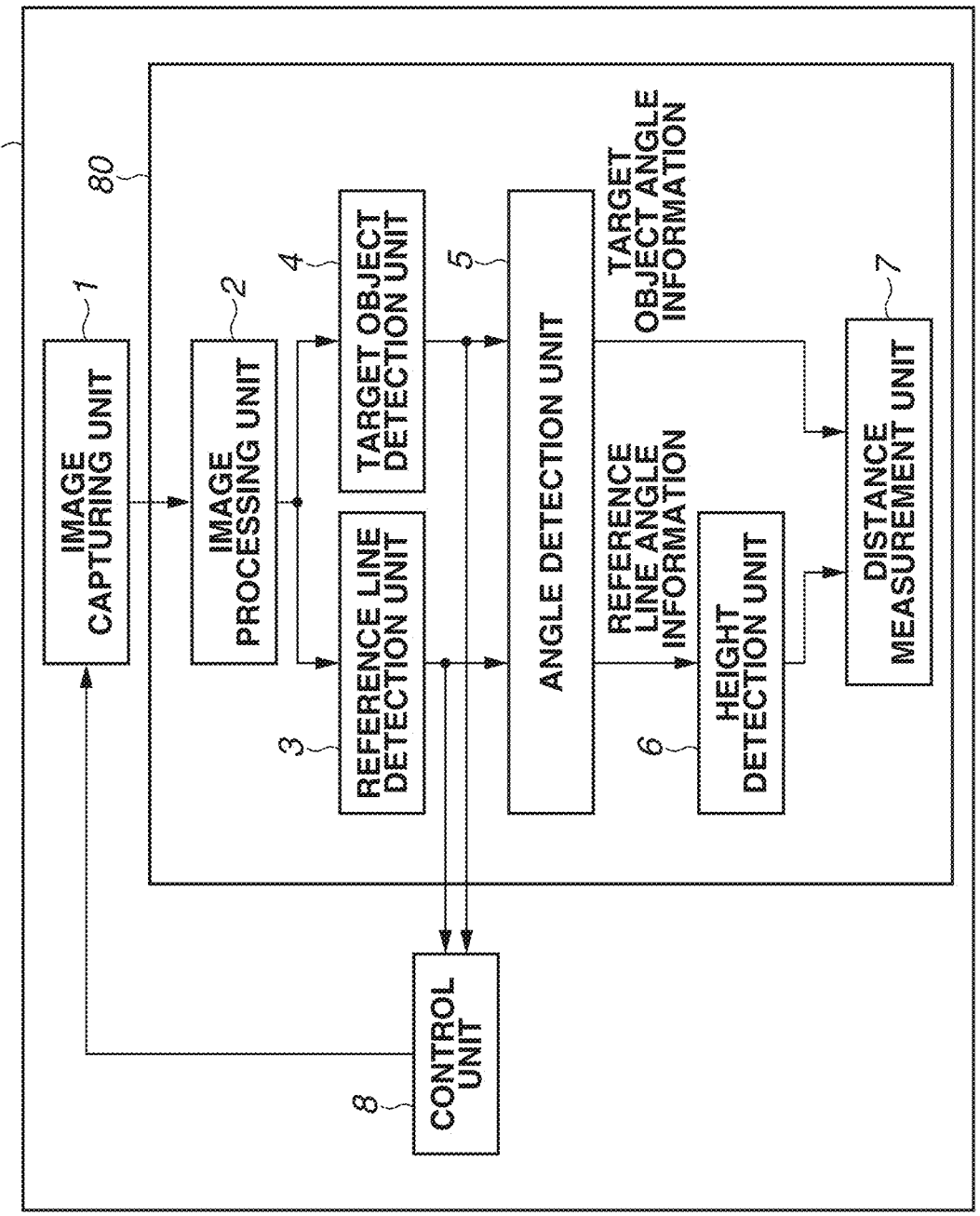
FIG. 1 is a diagram illustrating an example of a configuration of a distance measurement device.

FIG. 1 is a block diagram illustrating a distance measurement device 100 according to a first exemplary embodiment. FIG. 2 is a flowchart illustrating distance measurement processing executed by the distance measurement device 100 according to the present exemplary embodiment. The description is given below with reference to FIG. 1 and FIG. 2.

The distance measurement device 100 illustrated in FIG. 1 includes an image capturing unit 1, a control unit 8, and a calculation unit 80. The calculation unit 80 includes an image processing unit 2, a reference line detection unit 3, a target object detection unit 4, an angle detection unit 5, a height detection unit 6, and a distance measurement unit 7.

The units described throughout the present disclosure are exemplary and/or preferable modules for implementing processes described in the present disclosure. The modules can be hardware units (such as one or more processors, one or more memories, circuitry, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

The image capturing unit 1 is an image sensor, such as a Charge Coupled Device (CCD) image sensor or a Complementary Metal Oxide Semiconductor (CMOS) image sensor, in which a plurality of pixels is two-dimensionally arranged. The image capturing unit 1 captures an image including the horizontal line or the skyline as a reference line extending in a horizontal direction and a target object positioned closer to the image capturing unit 1 than the reference line, and thereby generates a captured image signal. The image capturing unit 1 outputs the captured image signal to the image processing unit 2. This processing executed by the image capturing unit 1 corresponds to image capturing processing in step S1 in the flowchart illustrated in FIG. 2.

The image processing unit 2 processes the captured image signal received from the image capturing unit 1, through processing including processing of clarifying the reference line and the target object by emphasizing a contrast between the reference line and the target object and processing of emphasizing edges of the reference line and the target object. The image processing unit 2 outputs the captured image signal that has been processed to the reference line detection unit 3 and to the target object detection unit 4. This processing executed by the image processing unit 2 corresponds to image processing in step S2 in the flowchart illustrated in FIG. 2.

The reference line detection unit 3 determines whether the reference line is detected from the captured image signal. The target object detection unit 4 determines whether the target object is detected from the captured image signal. The determination processing executed by the reference line detection unit 3 and the target object detection unit 4 corresponds to step S3 in the flowchart illustrated in FIG. 2. When the reference line detection unit 3 determines that the reference line is not detected and/or the target object detection unit 4 determines that the target object is not detected (NO in step S3), the reference line detection unit 3 and/or the target object detection unit 4 output(s) an instruction signal to the control unit 8. Upon receiving the instruction signal, the control unit 8, which may include one or more processors and one or more memories, adjusts an image capturing range of image capturing performed by the image capturing unit 1 through various ways. For example, the adjustment may be performed by adjusting an image capturing angle of the image capturing unit 1. In a configuration where the image capturing range of the image capturing unit 1 is partially cut out to obtain the captured image, the cutout portion may be changed. The adjustment of the image capturing range corresponds to step S4 in the flowchart illustrated in FIG. 2, and is performed when it is determined that at least one of the reference line and the target object is not detected.

When the reference line detection unit 3 determines that the reference line is detected and the target object detection unit 4 determines that the target object is detected in step S3 (YES in step S3), the reference line detection unit 3 generates the reference line information indicating the position of the reference line in the captured image signal and outputs the reference line information to the angle detection unit 5. Meanwhile, the target object detection unit 4 generates the target object information indicating the position of the target object in the captured image signal, and outputs the target object information to the angle detection unit 5. This generation of the reference line information and the target object information corresponds to step S5 in the flowchart illustrated in FIG. 2. The target object information indicates the position of the target object 10 relative to the reference line.

Based on the reference line information received, the angle detection unit 5 generates reference line angle information indicating an angle between a height direction of the image capturing unit 1 and a direction from the image capturing unit 1 to the reference line. The angle detection unit 5 outputs the reference line angle information to the height detection unit 6.

Based on the target object information received, the angle detection unit 5 generates target object angle information indicating an angle between the height direction of the image capturing unit 1 and a direction from the image capturing unit 1 to the target object. The angle detection unit 5 outputs the target object angle information to the distance measurement unit 7.

The generation of the reference line angle information and the target object angle information corresponds to step S6 in the flowchart illustrated in FIG. 2.

Based on the reference line angle information received, the height detection unit 6 generates height information indicating the height at which the image capturing unit 1 is provided. The height detection unit 6 outputs the height information to the distance measurement unit 7. The generation of the height information corresponds to step S7 in the flowchart illustrated in FIG. 2.

The distance measurement unit 7 uses the target object angle information and the height information received, to generate distance information indicating the distance between the image capturing unit 1 and the target object. In this manner, the distance measurement device 100 can measure the distance between the image capturing unit 1 and the target object. The generation of the distance information corresponds to step S8 in the flowchart illustrated in FIG. 2.

(Angle Detection)

Next, how the distance information is generated is described with reference to FIGS. 3A, 3B, and 4.

Figure 3A:
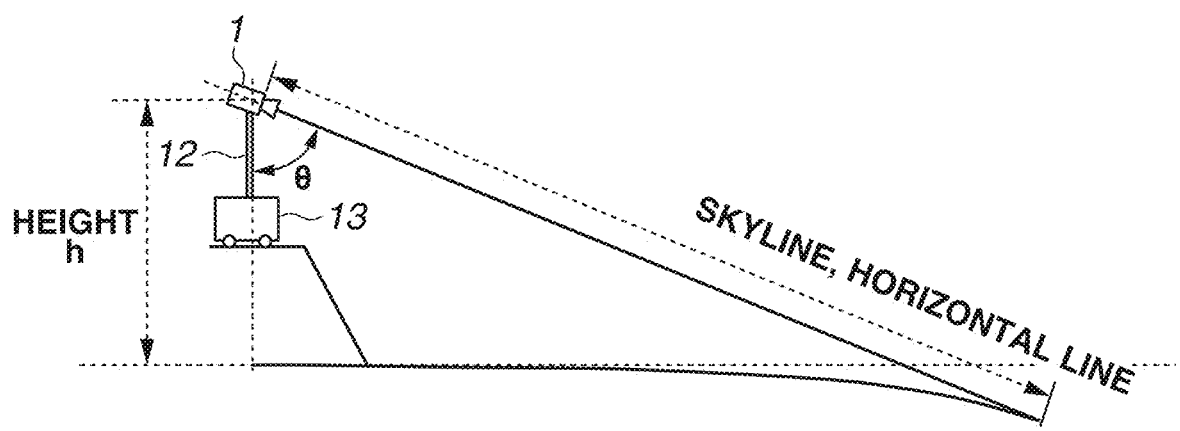
FIGS. 3A and 3B are each a diagram illustrating the distance measurement processing.

FIG. 3A illustrates the distance measurement device 100 and a reference line. The distance measurement device 100 is mounted to a pole 12 attached to a vehicle 13.

When the reference line is the horizontal line, the image capturing unit 1 of the distance measurement device 100 is at a height h from the water surface. When the reference line is the skyline, the image capturing unit 1 of the distance measurement device 100 is at the height h from the ground surface.

The angle detection unit 5 that has obtained the reference line angle information can obtain reference line angle information $\theta_{DATA}$ indicating an angle $\theta$ between the height direction of the image capturing unit 1 of the distance measurement device 100 and the direction from the image capturing unit 1 to the reference line.

Figure 3B:
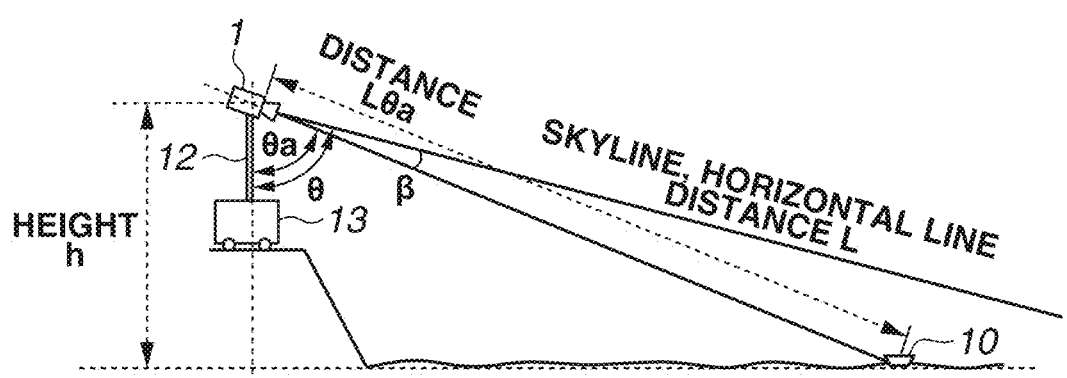

FIG. 3B illustrates the distance measurement device 100 and a target object 10.

The angle detection unit 5 that has obtained the target object angle information can obtain a target object angle information $\theta a_{DATA}$ indicating an angle $\theta a$ between the height direction of the image capturing unit 1 of the distance measurement device 100 and the direction from the image capturing unit 1 to the target object 10.

(Height Detection)

Figure 4:
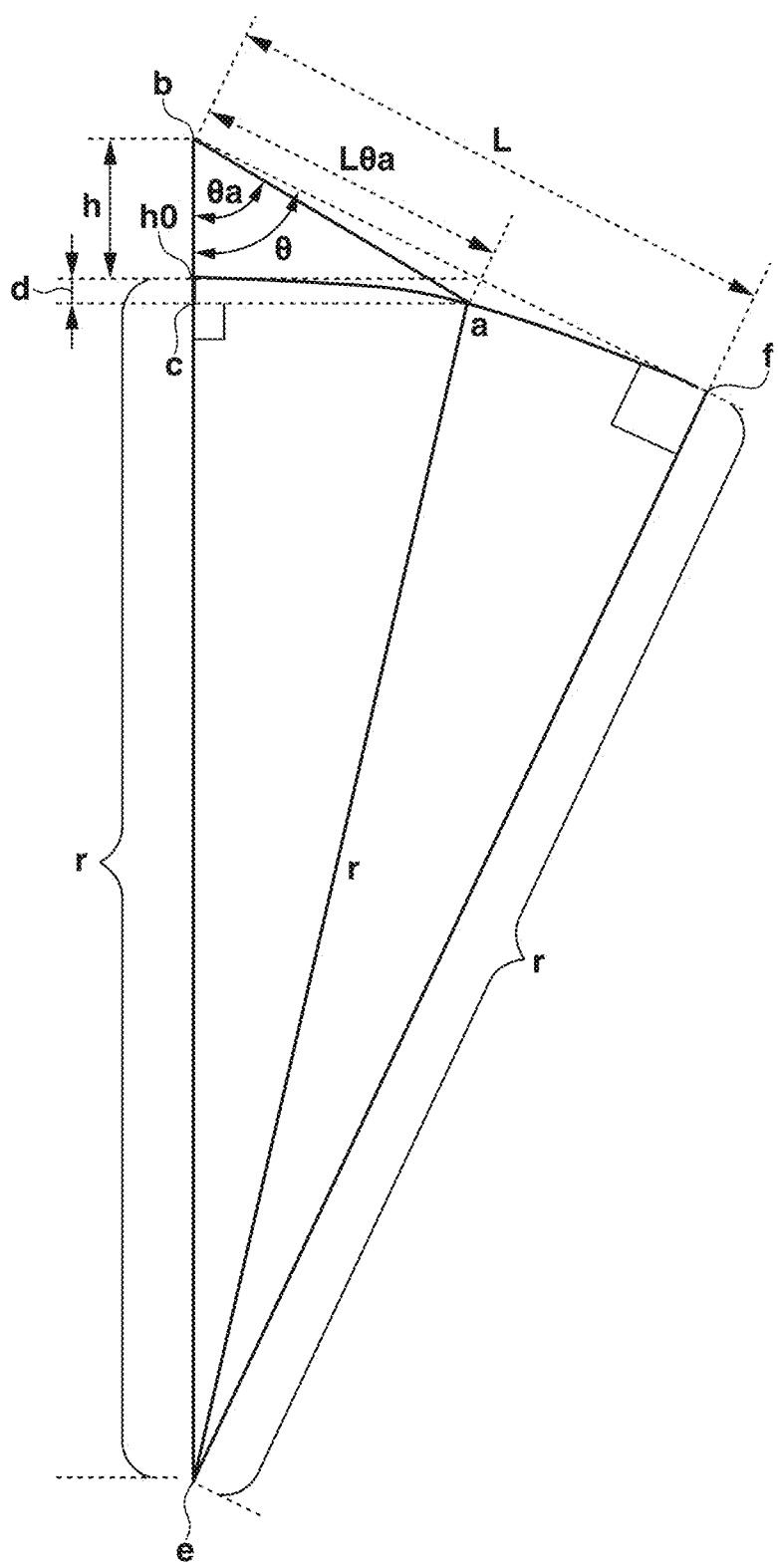
FIG. 4 is a diagram illustrating the distance measurement processing.

FIG. 4 illustrates how the distance is measured. In FIG. 4, a point a represents a position of the target object, a point b represents a position of the image capturing unit 1, a line f represents the reference line, and a point e represents the center of the earth.

The height detection unit 6 obtains height information $h_{DATA}$ indicating the height h at which the image capturing unit 1 is provided, through the following Formula (1).

[Formula (1)]

$$h_{DATA} = r\left(\frac{1}{\sin\theta_{DATA}} - 1\right) \quad (1)$$

In Formula (1), r represents the earth radius (unit: m).

(Distance Measurement)

FIG. 4 illustrates a right triangle ace defined by the point a representing the position of the target object 10, the center of the earth e, and an intersecting point c between a line be and a perpendicular line from the point a to the line be. The line be is a line between the image capturing unit 1 and the center of the earth e.

The figure also illustrates a right triangle acb defined by the point a representing the position of the target object 10, the intersecting point c between the line be, between the center of the earth e and the image capturing unit 1, and the perpendicular line from the point a to the line be, and the point b representing the position of the image capturing unit 1.

The right triangle ace and the right triangle acb shares a side ac.

The side ac is represented by the following Formula (2).

ps [Formula 2]

$$(h_{DATA}+d)\tan(\theta a_{DATA}) = \sqrt{r^2-(r-d)^2} \quad (2)$$

In the formula, d represents a length as a difference between the height h and a length between the point b representing the position of the image capturing unit 1 and the point c, as illustrated in FIG. 4. The length d can also be regarded as a length between the point c and a point h0. The point c is the intersecting point between the height direction of the image capturing unit 1 and the perpendicular line from the position of the target object 10 to the height direction of the image capturing unit 1. The point h0 is a position where the height at which the image capturing unit 1 is provided is zero.

A quadratic equation for the length d is obtained by respectively substituting h, θa, and r in Formula (2) for values of the height information $h_{DATA}$ indicating the height h obtained with Formula (1), the target object angle information $\theta a_{DATA}$, and the earth radius. Thus, length information $d_{DATA}$ indicating the length d can be obtained by solving the quadratic equation.

Distance information $L\theta a_{DATA}$ indicating a distance Lθa between the image capturing unit 1 and the target object 10 is obtained with the following Formula (3).

[Formula (3)]

$$L\theta a_{DATA} = \frac{(h_{DATA} + d)}{\cos(\theta a_{DATA})} \quad (3)$$

As described above, the length information $d_{DATA}$ can be obtained with the height information $h_{DATA}$ obtained by the height detection unit 6 and the target object angle information $\theta a_{DATA}$ obtained by the angle detection unit 5. The distance measurement unit 7 can obtain the distance information $L\theta a_{DATA}$ based on the length information $d_{DATA}$, the height information $h_{DATA}$, and the target object angle information $\theta a_{DATA}$.

As described above, the distance measurement device 100 according to the present exemplary embodiment can obtain the distance information indicating the distance between the image capturing unit 1 and the target object, by using the target object angle information and the height information. Thus, the generation of the distance requires no known pattern or a predetermined subject in contact with the skyline. Thus, the distance measurement device according to the present exemplary embodiment can generate the distance information indicating the distance between the image capturing unit 1 and the target object, even when the known pattern is unavailable or when there is no subject in contact with the skyline.

The distance measurement device 100 according to the present exemplary embodiment can obtain the distance information without irradiating the target object 10 with light or electric waves as in a case where an electronic distance measuring instrument is used. Thus, safe distance measurement can be guaranteed with the distance measurement device 100 according to the present exemplary embodiment, even when the target object is a living thing.

The distance measurement device 100 can perform the measurement with a single image capturing unit 1. Thus, the distance measurement device 100 according to the present exemplary embodiment can be formed as a more compact system, compared with a distance measurement device based on a parallax obtained with a stereo camera including a plurality of cameras.

The distance measurement device 100 according to the present exemplary embodiment may be combined with the electronic distance measuring instrument and/or the stereo camera. Thus, for example, the electronic distance measuring instrument or the stereo camera may be used for the distance measurement when the reference line is difficult to detect.

In the present exemplary embodiment, the reference line angle information is obtained from the captured image signal. Alternatively, the reference line angle information may be input to the distance measurement device 100 from the outside. For example, a detector that detects a mounting angle of the image capturing unit 1 may input the reference line angle information to the distance measurement unit 7 of the distance measurement device 100.

In the present exemplary embodiment, the height information is obtained based on the reference line angle information. Alternatively, the height information may be input to the distance measurement device 100 from the outside. For example, a Global Positioning System (GPS) receiver attached to the distance measurement device 100 may input the height information to the distance measurement unit 7. Furthermore, the electronic distance measurement instrument may be provided to the distance measurement device 100, and obtain the height information indicating a height of the ground surface or the water surface.

In the present exemplary embodiment, the distance measurement device 100 is mounted to the vehicle 13. Alternatively, the distance measurement device 100 may be mounted to a flying object such as an unmanned aerial vehicle.

The distance measurement device 100 according to the present exemplary embodiment may be implemented with a single semiconductor chip. For example, the single semiconductor chip may be formed by stacking a first semiconductor substrate on which the image capturing unit 1 is formed and a second semiconductor substrate on which the remaining elements of the distance measurement device 100 illustrated in FIG. 1 are formed.

A second exemplary embodiment is described while focusing on differences from the first exemplary embodiment.

(Configuration of Distance Measurement Device)

Figure 5:
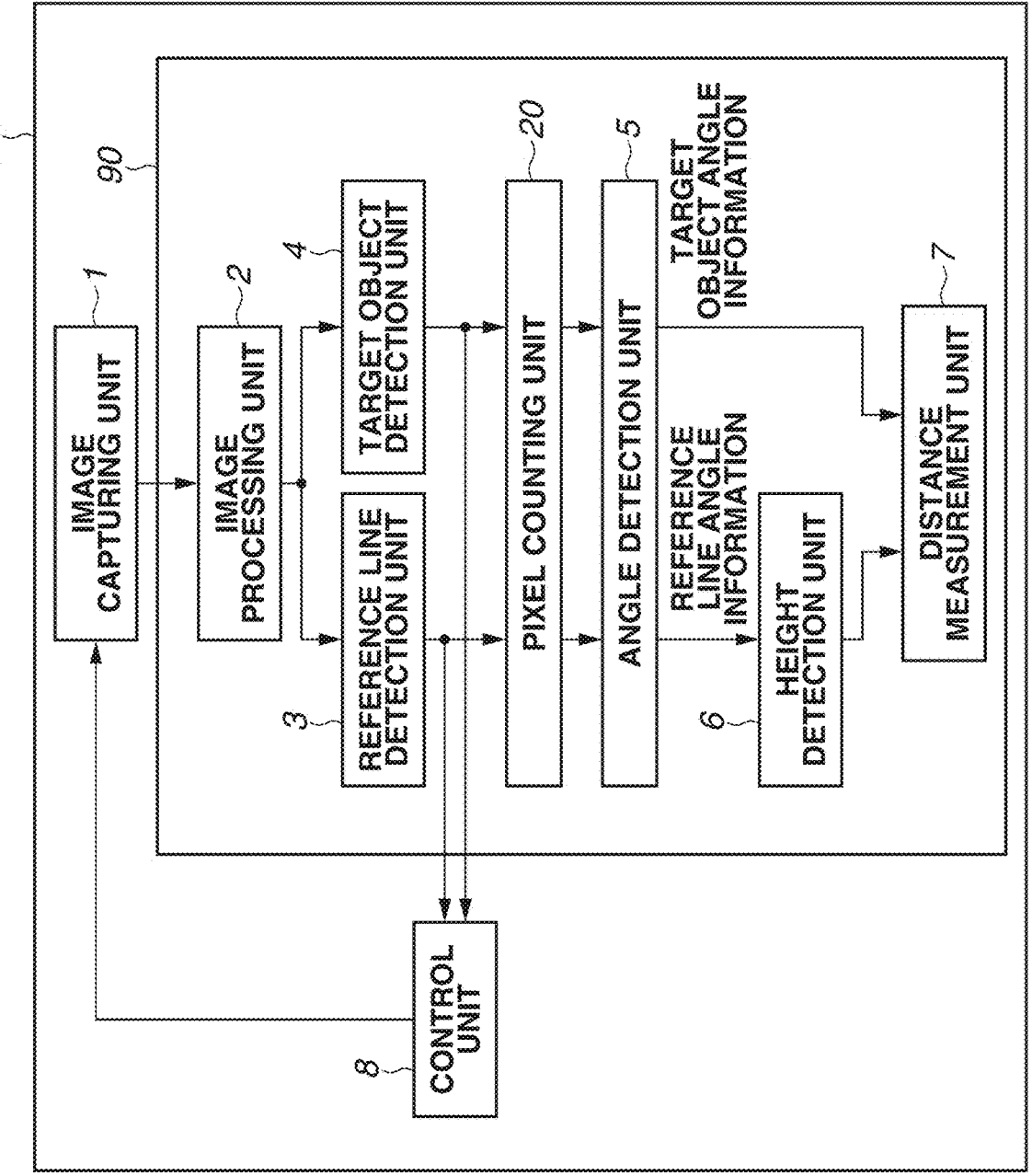
FIG. 5 is a diagram illustrating an example of a configuration of a distance measurement device.

FIG. 5 is a diagram illustrating a configuration of a distance measurement device 200 according to the present exemplary embodiment.

The distance measurement device 200 according to the present exemplary embodiment includes a calculation unit 90. The calculation unit 90 includes a pixel counting unit 20. The other configuration is the same as that of the distance measurement device 100 according to the present exemplary embodiment.

The pixel counting unit 20 receives the reference line position from the reference line detection unit 3 and receives the target object position from the target object detection unit 4.

Figure 6A:
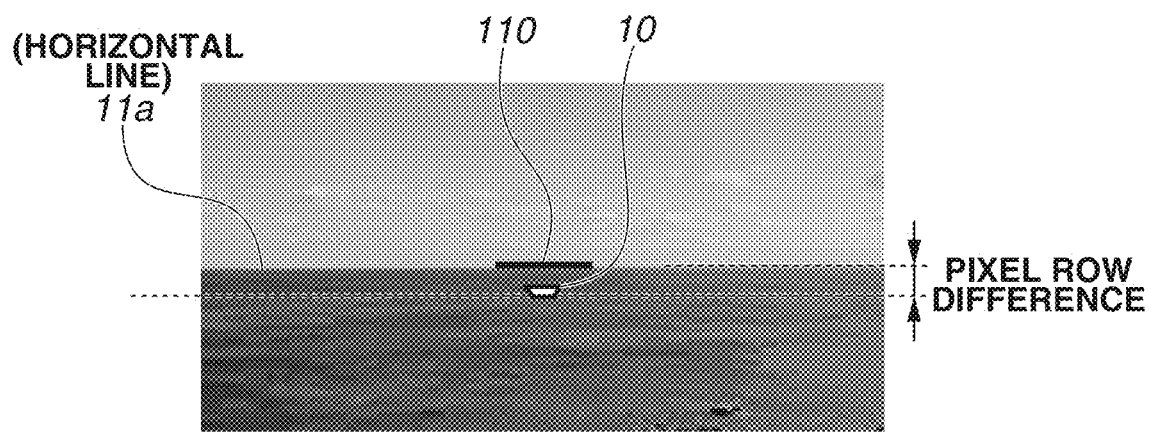
FIGS. 6A and 6B are each a diagram illustrating distance measurement processing.

FIG. 6A illustrates a captured image, including a horizontal line 11a and the target object 10, corresponding to a captured image signal. The reference line detection unit 3 detects a row position of the pixel in the image capturing unit 1 corresponding to a line 110 as a part of the horizontal line 11a. The reference line detection unit 3 outputs the reference position, as a result of the detection, to the pixel counting unit 20 and the angle detection unit 5. The target object detection unit 4 detects a row position of the pixel in the image capturing unit 1 corresponding to the target object 10. The target object detection unit 4 outputs the target object position, as a result of the detection, to the pixel counting unit 20 and the angle detection unit 5.

The pixel counting unit 20 detects a row difference between the target object position and the reference position. The pixel counting unit 20 outputs row difference information as the detected difference to the angle detection unit 5.

The angle detection unit 5 obtains the target object angle information $\theta a_{DATA}$ based on the row difference information received. The angle θa illustrated in FIG. 3B is obtained with the following Formula (4).

[Formula (4)]

$$\theta a = \theta - \frac{\text{row difference information} \times \text{vertical field angle}}{\text{number of pixels in vertical direction}} \quad (4)$$

In the formula, vertical field angle represents a field angle of the captured image signal in the vertical direction, and number of pixels in vertical direction represents the number of pixel rows used for reading a captured image signal.

The angle detection unit 5 obtains the reference line angle information $\theta_{DATA}$ by substituting the θ in Formula (4) for the reference line angle information $\theta_{DATA}$.

The other processing executed by the distance measurement device 200 according to the present exemplary embodiment may be the same as that in the first exemplary embodiment.

Figure 6B:
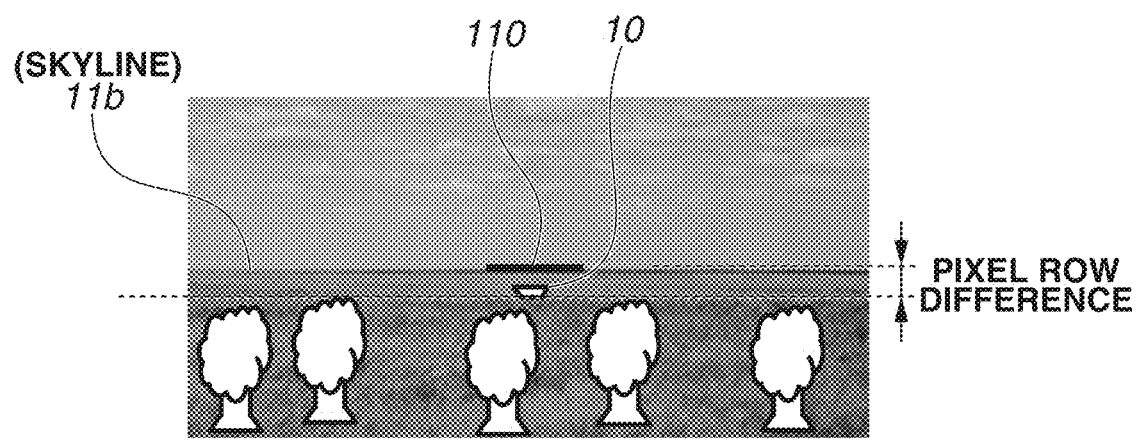

In the example described in the present exemplary embodiment, the captured image signal corresponds to a captured image including the horizontal line 11a and the target object 10 as illustrated in FIG. 6A. Alternatively, a captured image including a skyline 11b and the target object 10 as illustrated in FIG. 6B may be used to similarly obtain the target object angle information $\theta a_{DATA}$ with Formula (4) described above.

Distance measurement processing in a case where the target object is a moving body is described below.

The distance measurement processing for a moving body may include moving the image capturing range of the image capturing unit 1 so that the moving body stays at the center of the image corresponding to the captured image signal in the horizontal direction.

An example where the target object moves in the horizontal direction from the center of the image corresponding to the image signal is described below. This occurs when the image capturing range of the image capturing unit 1 is fixed, or when the image capturing range of the image capturing unit 1 fails to move at the same speed as the target object.

Figure 7:
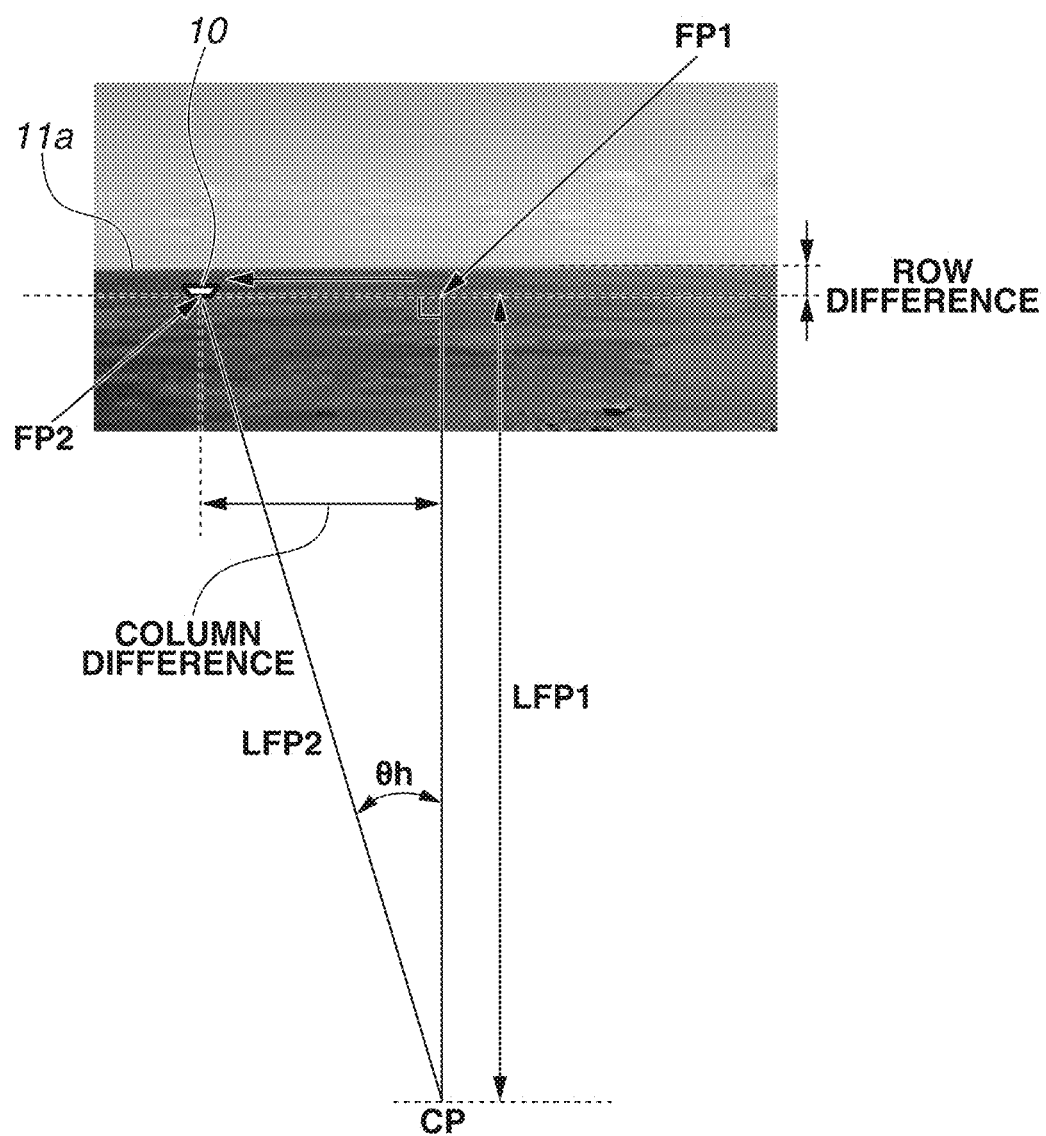
FIG. 7 is a diagram illustrating an example of distance measurement processing.

FIG. 7 illustrates an image captured after the target object, which has been at a center position FP1 in the image illustrated in FIG. 6A in the horizontal direction, has moved to a left side position FP2.

A distance LFP1 between a camera position CP and the initial position FP1 is calculated in a manner described above in the exemplary embodiment.

The target object detection unit 4 detects a column position of a pixel of the image capturing unit 1 corresponding to the position FP2. Then, the target object detection unit 4 detects a column difference as a difference between the column position of the pixel of the image capturing unit 1 corresponding to the position FP1 and the column position of the pixel of the image capturing unit 1 corresponding to the position FP2.

The angle detection unit 5 can obtain the angle θh based on this column difference and the horizontal field angle of the captured image signal. Thus, the distance LFP2 can be obtained with the following Formula (5).

[Formula (5)]

$$LFP2 = \frac{LFP1}{\cos(\theta h)} \quad (5)$$

When the target object moves in both the horizontal direction and the vertical direction, the angle detection unit 5 may first obtain an amount of the movement of the target object in the vertical direction and then obtain an amount of the movement of the target object in the horizontal direction.

As described above, the distance information can be obtained without moving the image capturing unit 1 even when the target object is a moving body.

A third exemplary embodiment is described while focusing on differences from the first exemplary embodiment.

Figure 8:
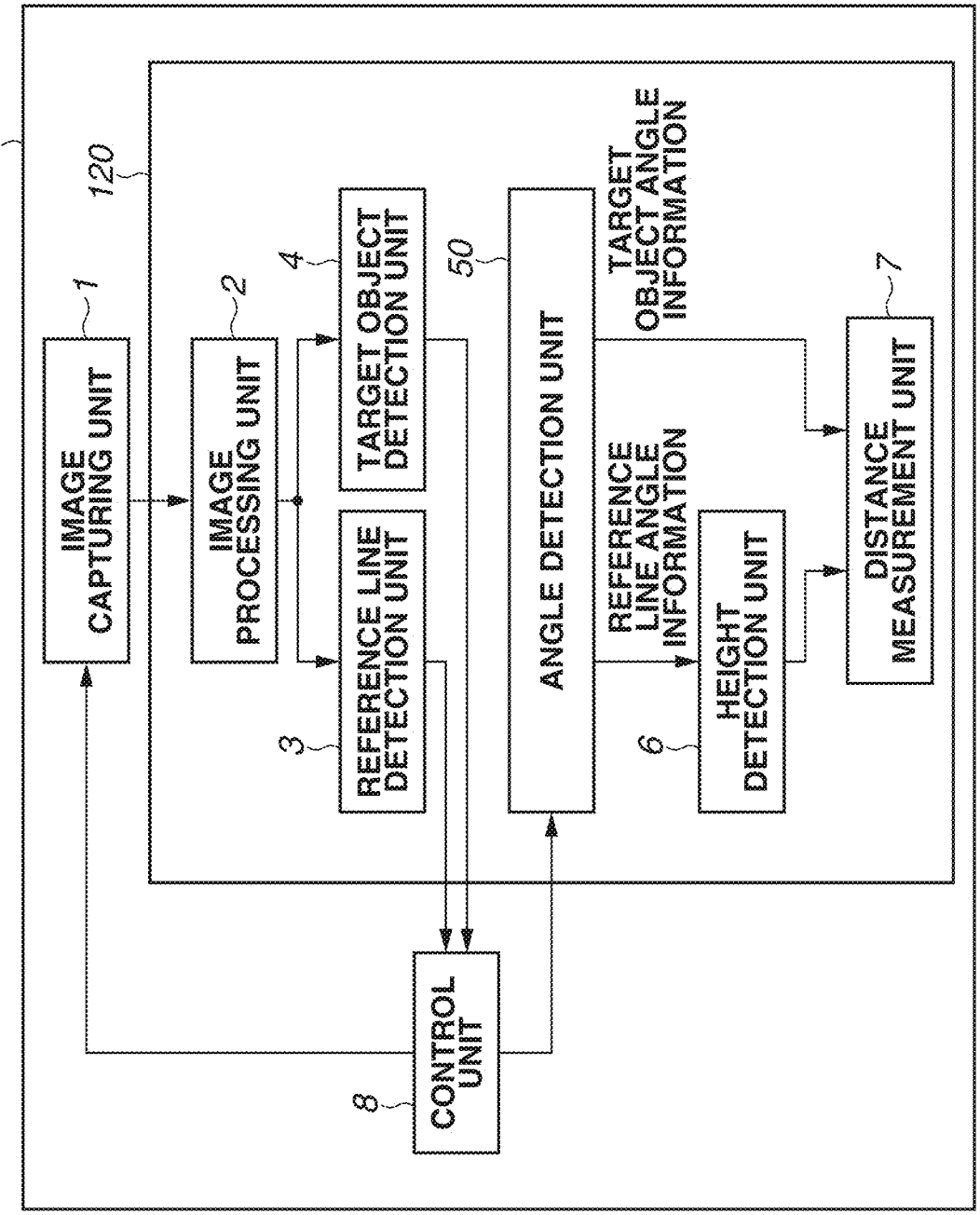
FIG. 8 is a diagram illustrating an example of a configuration of a distance measurement device.

FIG. 8 illustrates a distance measurement device 300 according to the present exemplary embodiment. The distance measurement device 300 according to the present exemplary embodiment includes a calculation unit 120. The calculation unit 120 according to the present exemplary embodiment includes the reference line detection unit 3 and the target object detection unit 4 that respectively input the reference line information and the target object information to the control unit 8.

How the target object angle information $\theta a_{DATA}$ is obtained in the present exemplary embodiment is described.

The image capturing unit 1 generates the captured image signal corresponding to the captured image illustrated in FIG. 6A. The image processing unit 2 outputs the captured image signal corresponding to the captured image illustrated in FIG. 6A to the reference line detection unit 3 and the target object detection unit 4.

The reference line detection unit 3 detects the row position of the pixel of the image capturing unit 1 corresponding to the line 110 as a part of the horizontal line 11a as described in the second exemplary embodiment. The reference line detection unit 3 obtains the reference position as a result of the detection.

The control unit 8, which may include one or more processors and one or more memories, adjusts the angle of the image capturing unit 1 in such a manner that the reference position matches the center of the vertical pixel row of the image corresponding to the captured image signal.

The angle detection unit 50 measures an angle with which the reference position matches the center of the vertical pixel row. Thus, the reference line angle information $\theta_{DATA}$ is obtained.

The target object detection unit 4 detects the row position of the pixel of the image capturing unit 1 corresponding to the target object 10 as in the second exemplary embodiment. The target object detection unit 4 obtains a result of the detection as the target object position.

The control unit 8 adjusts the angle of the image capturing unit 1 in such a manner that the target object position matches the center of the vertical pixel row of the image corresponding to the captured image signal.

The angle detection unit 50 measures an angle with which the target object position matches the center of the vertical pixel row. Thus, the target object angle information $\theta a_{DATA}$ is obtained.

As described above, the angle detection unit 50 detects the angle of the image capturing unit 1 by using the position at the center of the vertical pixel row as a reference. Thus, the angle detection unit 50 can obtain the reference line angle information $\theta_{DATA}$ and the target object angle information $\theta A_{DATA}$. Thus, the distance measurement device 300 according to the present exemplary embodiment can obtain the distance information $L\theta a_{DATA}$.

A fourth exemplary embodiment relates to an image capturing system including an image capturing control device.

Figure 9:
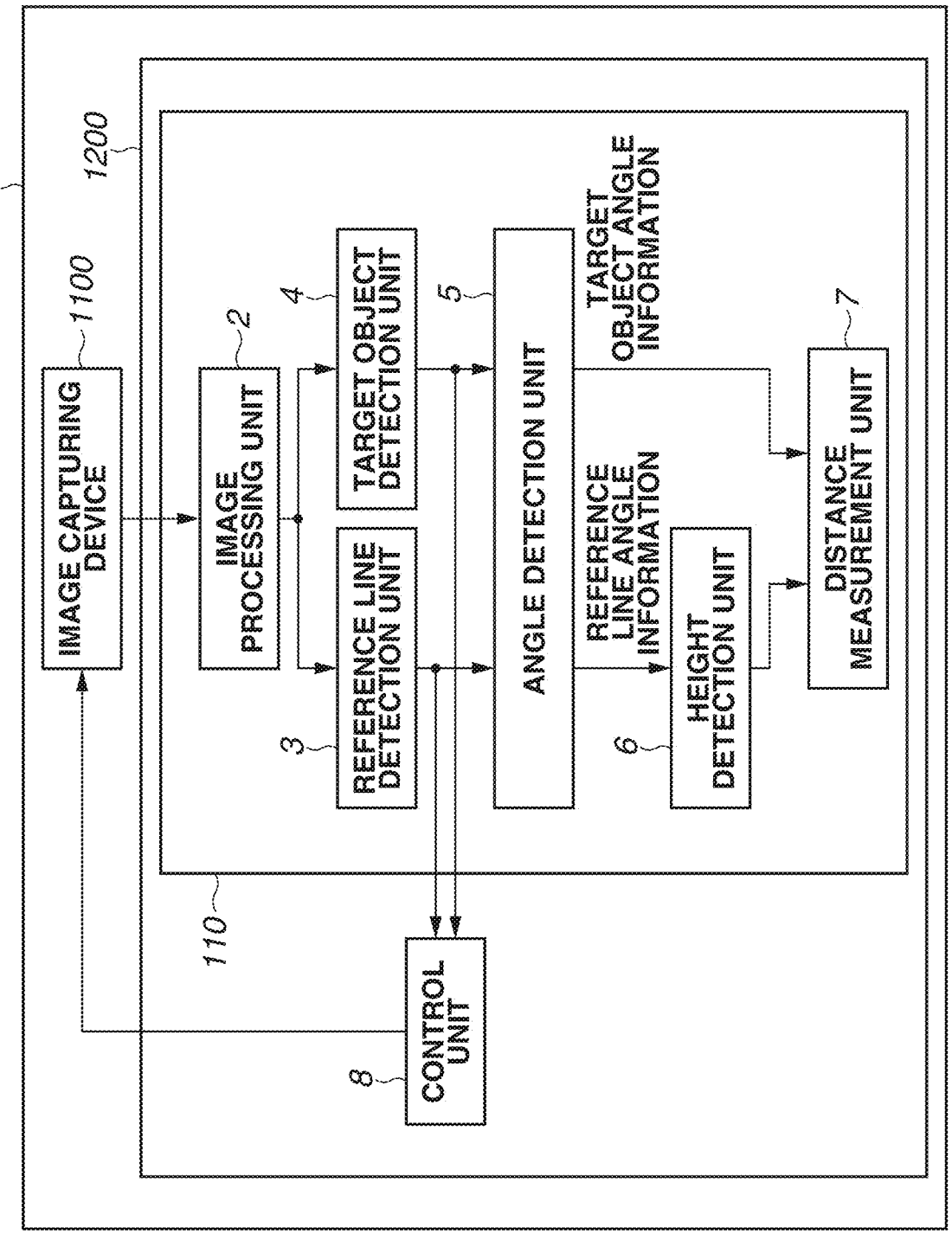
FIG. 9 is a diagram illustrating an example of a configuration of an image capturing system.

FIG. 9 illustrates a configuration of an image capturing system 1000 according to the present exemplary embodiment.

The image capturing system 1000 includes an image capturing device 1100 and an image capturing control device 1200.

The image capturing device 1100 includes the image capturing unit 1 according to the first exemplary embodiment.

The image capturing control device 1200 includes the image processing unit 2, the reference line detection unit 3, the target object detection unit 4, the angle detection unit 5, the height detection unit 6, the distance measurement unit 7, and the control unit 8.

The control unit 8 of the image capturing control device 1200 controls the image capturing unit 1 of the image capturing device 1100. The control includes controlling the image capturing angle of the image capturing unit 1, and may further include various types of control such as controlling shutter speed setting, an ISO sensitivity setting, aperture value setting, or the like of the image capturing unit 1.

An example of the image capturing system 1000 is described. In one example, the image capturing control device 1200 may be provided at a location (for example, a monitor room) that is different from a location where a monitoring camera, as an example of the image capturing device 1100, is provided. In another example, the image capturing device 1100 is provided to an unmanned aerial vehicle, and the image capturing control device 1200 is provided in a monitor room for controlling the unmanned aerial vehicle.

The image capturing system 1000 according to the present exemplary embodiment includes the image capturing control device 1200 including the distance measurement unit 7, and thus can provide the same effect as that provided in the first exemplary embodiment.

The image capturing system 1000 according to the present exemplary embodiment has a configuration corresponding to that of the distance measurement device 100 according to the first exemplary embodiment. Alternatively, the image capturing system 1000 may have a configuration corresponding to that of the configuration of the distance measurement device 200 or 300 according to the second or the third exemplary embodiment.

An image capturing system and a moving body according to a fifth exemplary embodiment are described with reference to FIGS. 10A and 10B and FIG. 11.

Figure 10A:
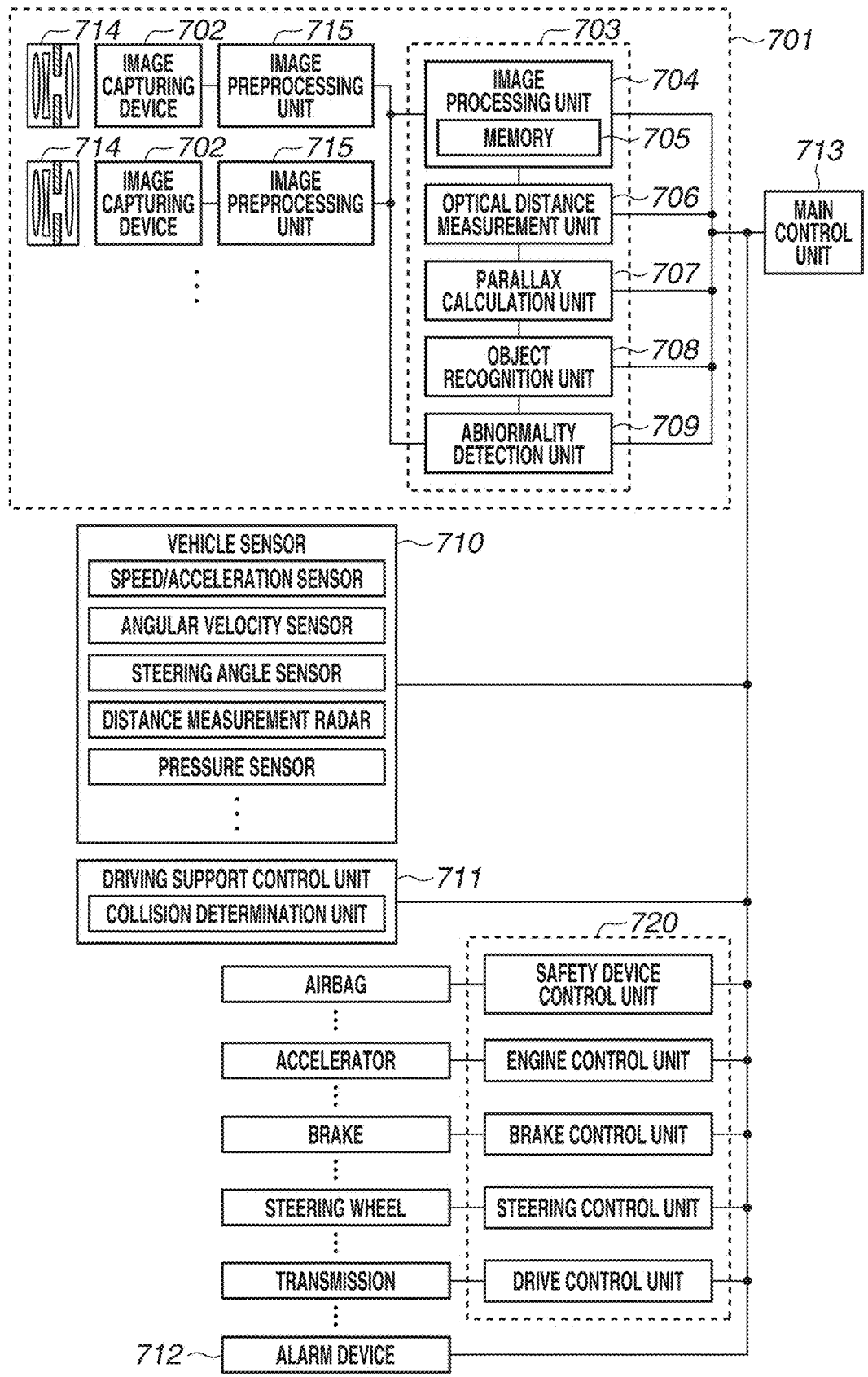

FIGS. 10A and 10B are schematic diagrams illustrating exemplary configurations of the image capturing system and the moving body. FIG. 11 is a flowchart illustrating processing executed by the image capturing system according to the present exemplary embodiment.

An example of the image capturing system according to the present exemplary embodiment relates to an on-vehicle camera. FIGS. 10A and 10B illustrate examples of a vehicle system and an image capturing system provided to the vehicle system. An image capturing system 701 includes an image capturing device 702, an image preprocessing unit 715, an integrated circuit 703, and an optical system 714. The optical system 714 forms an optical image of a subject in the image capturing device 702. The image capturing device 702 converts the optical image of the subject form by the optical system 714 into an electric signal. The image capturing device 702 includes the image capturing unit 1 according to the first exemplary embodiment. The image preprocessing unit 715 executes predetermined signal processing on a signal output from the image capturing device 702. The function of the image preprocessing unit 715 may be embedded in the image capturing device 702. The image capturing system 701 includes at least two groups each including the optical system 714, the image capturing devices 702, and the image preprocessing unit 715. An output from the image preprocessing unit 715 in each group is input to the integrated circuit 703.

The integrated circuit 703 is an integrated circuit for the image capturing system, and includes an image processing unit 704 including a memory 705, an optical distance measurement unit 706, a parallax calculation unit 707, an object recognition unit 708, and an abnormality detection unit 709. The image processing unit 704 executes image processing such as developing processing or defect correction on the output signal from the image preprocessing unit 715. The memory 705 serves as a primary memory for a captured image and stores a defected position of an image sensor pixel. The optical distance measurement unit 706 is in charge of focusing on and measuring a distance to a subject. The parallax calculation unit 707 calculates a parallax (phase difference between parallax images) from a plurality of image data pieces obtained by a plurality of the image capturing devices 702. The object recognition unit 708 recognizes a subject such as a car, a road, a sign, or a person. Upon detecting an abnormality of the image capturing device 702, the abnormality detection unit 709 issues an alarm indicating the abnormality to a main control unit 713. The integrated circuit 703 further includes a control unit (not illustrated) that controls the image capturing unit 1 of the image capturing device 702. The control includes controlling the image capturing angle of the image capturing unit 1.

The integrated circuit 703 may be implemented by hardware of a dedicated design, a software module, or a combination of these. The integrated circuit 703 may be implemented by a Field Programmable Gate Array (FPGA), an Application Specific Integrated Circuit (ASIC), or a combination of them.

The main control unit 713 performs overall control on operations performed by the image capturing system 701, the vehicle sensor 710, the control unit 720, and the like. A configuration in which the main control unit 713 is omitted, and the image capturing system 701, the vehicle sensor 710, and control unit 720, each provided with a communication interface, transmit and receive a control signal to and from each other through a communication network may be employed (for example, a Controller Area Network (CAN) standard).

The integrated circuit 703 has a function of transmitting a control signal or a setting value to the image capturing device 702, upon receiving a control signal from the main control unit 713 or under control performed by an own control unit. For example, the setting transmitted from the integrated circuit 703 is for pulse driving of a voltage switch in the image capturing device 702, or the like.

The image capturing system 701 is connected to the vehicle sensor 710 and can detect a vehicle driving state such as vehicle speed, a yaw rate, and a steering angle, as well as a vehicle outer environment or a state of other vehicles and obstacles. The vehicle sensor 710 also serves as a distance information obtaining unit that obtains distance information indicating a distance to a target object, based on a parallax image. The image capturing system 701 is further connected to a driving support control unit 711 that performs various types of driving support including automatic steering, autonomous driving, and anti-collision functions. In particular, the collision determination function is implemented by estimating/determining collision with another vehicle/obstacle, based on a result of the detection by the image capturing system 701 and the vehicle sensor 710. Thus, avoidance control is performed when collision is expected to occur, or safety-device activation is performed when collision occurs.

The image capturing system 701 is further connected to an alarm device 712 that issues an alarm to a driver, based on a result of the determination performed by a collision determination unit. For example, when a result of the determination by the collision determination unit indicates that collision is likely to occur, the main control unit 713 performs vehicle control for avoiding the collision or reducing a damage, through applying a brake, releasing an accelerator, or reducing an engine output. The alarm device 712 issues an alarm to the driver through various ways including emitting alarm sound, displaying alarm information on a screen of a display unit such as a car navigation system or a meter panel, and vibrating a seatbelt or a steering wheel.

In the present exemplary embodiment, the image capturing system 701 captures an image around the vehicle, that is, on the forward side or a back side for example. FIG. 10B illustrates an arrangement example of the image capturing system 701 for capturing an image of a vehicle forward side.

The two image capturing devices 702 are arranged on the forward side of a vehicle 700. More specifically, for obtaining distance information indicating a distance between the vehicle 700 and a target object and determining whether collision occurs, the two image capturing devices 702 are preferably symmetrically arranged about an axis of symmetry as a center line extending in a forward and backward direction or relative to an outer shape (vehicle width) of the vehicle 700. The image capturing devices 702 are preferably arranged without interfering with a field of view of a driver trying to visually check a condition outside the vehicle 700. The alarm device 712 is preferably arranged to be visually recognizable by the driver.

Next, failure detection processing executed with the image capturing devices 702 of the image capturing system 701 is described with reference to FIG. 11. The failure detection processing with the image capturing devices 702 is executed through steps S810 to S880 in FIG. 11.

In step S810, startup setting is performed for the image capturing device 702. More specifically, the setting for processing executed by the image capturing device 702 is transmitted from the outside (for example, from the main control unit 713) of the image capturing system 701 or from the inside of the image capturing system 701. Then, the image capturing devices 702 start image capturing processing and the failure detection processing. The setting for the processing executed by the image capturing devices 702 includes setting for controlling the voltage switch.

Then, in step S820, signals are acquired from image acquisition pixels in a scanned row. In step S830, output values are acquired from failure detection pixels in the scanned row. The order of steps S820 and S830 may be reversed.

Then, in step S840, whether actual output values from the failure detection pixels match expected output values from the failure detection pixels.

When the result of the determination in step S840 indicates that the actual output values match the expected output values (YES in step S840), the processing proceeds to step S850. In step S850, it is determined that an image capturing operation in the first area 10 is normally performed, and then the processing proceeds to step S860. In step S860, the signals from pixels in the scanned row are transmitted to the memory 705 as the main memory. Then, the processing returns to step S820, and the failure detection processing continues.

On the other hand, when the result of the determination in step S840 indicates that the actual output values do not match the expected output vales (NO in step S840), the processing proceeds to step S870. In step S870, it is determined that there is an abnormality in the image capturing operation in the first area 10, and thus an alarm is issued to the main control unit 713 or the alarm device 712. The alarm device 712 causes the display unit to display information indicating the abnormality. Then, in step S880, the image capturing device 702 is stopped, and the operation of the image capturing system 701 is terminated.

In the example described in the present exemplary embodiment, a loop of the processing in the flowchart is performed for each row. Alternatively, the loop of the processing in the flowchart may be performed for each predetermined number of rows. Furthermore, the failure detection operation may be performed for each frame.

In the present exemplary embodiment, the control for preventing collision with another vehicle is described. Alternatively, control for achieving autonomous driving for following another vehicle, control for achieving autonomous driving for keeping the vehicle within the lane, or the other like control may be performed. The moving body including the image capturing system 701 is not limited to a vehicle as described above, and may be applied to a moving body (moving device) such as a vessel, an aircraft, or an industrial robot, for example. Furthermore, the image capturing system 701 is not limited to the moving body, and may be widely applied to devices that employ object recognition such as an Intelligent Transport Systems (ITS).

The exemplary embodiments described above are each merely an example of how the present disclosure is implemented, and thus the technical scope of the present disclosure should not be construed in a limiting sense due to these exemplary embodiments. Thus, the present disclosure may be implemented in various ways without departing from the technical scope or the main features thereof. Furthermore, the present disclosure may be implemented by combining the exemplary embodiments in various ways.

The present disclosure can provide an effect that distance information indicating a distance to a target object can be obtained even when a known pattern is unavailable or when a subject is not in contact with the skyline.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors and one or more memories (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-168611, filed Aug. 30, 2016, which is hereby incorporated by reference herein in its entirety.

What is claimed is:

1. A device measurement device comprising:
an image capturing unit; and
a calculation unit,
wherein the image capturing unit is configured to output a captured image signal by capturing an image including a reference line extending in a horizontal direction and a target object positioned closer to the image capturing unit than the reference line, to the calculation unit,
wherein the calculation unit is configured to obtain reference line angle information indicating an angle between a direction from the image capturing unit to the reference line and a height direction of the image capturing unit, by using the captured image signal,
wherein the calculation unit is configured to obtain height information indicating a height at which the image capturing unit is provided, based on the reference line angle information,
wherein the calculation unit is configured to obtain target object angle information indicating an angle between a direction from the image capturing unit to the target object and the height direction of the image capturing unit, by using the captured image signal, and
wherein the calculation unit is configured to obtain distance information indicating a distance between the image capturing unit and the target object, by using the height information, the target object angle information and a value of an earth radius.

2. A distance measurement device comprising:
an image capturing unit; and
a calculation unit,
wherein the image capturing unit is configured to output a captured image signal by capturing an image including a reference line extending in a horizontal direction and a target object positioned closer to the image capturing unit than the reference line, to the calculation unit,
wherein the calculation unit is configured to obtain reference line angle information indicating an angle between a direction from the image capturing unit to the reference line and a height direction of the image capturing unit, by using the captured image signal,
wherein the calculation unit is configured to obtain height information indicating a height at which the image capturing unit is provided, based on the reference line angle information,
wherein the calculation unit is configured to obtain target object angle information indicating an angle between a direction from the image capturing unit to the target object and the height direction of the image capturing unit, by using the captured image signal, and
wherein the calculation unit is configured to obtain distance information indicating a distance between the image capturing unit and the target object, by using the height information and the target object angle information,
wherein the calculation unit is configured to obtain the height information in accordance with following Formula (1),

[Formula (1)]

$$h_{DATA} = r\left(\frac{1}{\sin\theta_{DATA}} - 1\right), \quad (1)$$

where
$h_{DATA}$: the height information
r: earth radius (m)
$\theta_{DATA}$: the reference line angle information.

3. The distance measurement device according to claim 2, wherein the calculation unit is configured to obtain a distance d between an intersecting point between the height direction of the image capturing unit and a perpendicular line from a position of the target object to the height direction of the image capturing unit, and a position where the height is zero, by using the target object angle information and the height information, in accordance with following Formula (2),

[Formula (2)]

$$(h_{DATA} + d)\tan(\theta a_{DATA}) = \sqrt{r^2 - (r-d)^2} \quad (2),$$

where $\theta a_{DATA}$: the target object angle information.

4. The distance measurement device according to claim 3, wherein the calculation unit is configured to obtain the distance information in accordance with following Formula (3),

[Formula (3)]

$$L\theta a_{DATA} = \frac{(h_{DATA} + d)}{\cos(\theta a_{DATA})}, \quad (3)$$

where $L\theta a_{DATA}$: the distance information.

5. A distance measurement device comprising:
an image capturing unit; and
a calculation unit,
wherein the image capturing unit is configured to output a captured image signal by capturing an image including a reference line extending in a horizontal direction and a target object positioned closer to the image capturing unit than the reference line, to the calculation unit,
wherein the calculation unit is configured to obtain position information indicating a position of the target object relative to the reference line, by using the captured image signal,
wherein the calculation unit is configured to obtain target object angle information indicating an angle between a direction from the image capturing unit to the target object and a height direction of the image capturing unit, by using the position information, and
wherein the calculation unit is configured to obtain distance information indicating a distance between the image capturing unit and the target object, by using height information indicating a height at which the image capturing unit is provided, the target object angle information and a value of an earth radius.

6. The distance measurement device according to claim 5, wherein the image capturing unit includes a plurality of pixels,
wherein the distance measurement device further comprises:
a reference line detection unit configured to detect a pixel with which an image of the reference line is obtained in an image corresponding to the captured image signal, from the plurality of pixels; and
a target object detection unit configured to detect a pixel with which an image of the target object is obtained in the image corresponding to the captured image signal, from the plurality of pixels, and
wherein the calculation unit is configured to obtain the position information based on a detection result from each of the reference line detection unit and the target object detection unit.

7. The distance measurement device according to claim 1, wherein the reference line is a horizontal line or a skyline.

8. The distance measurement device according to claim 4, wherein the reference line is a horizontal line or a skyline.

9. The distance measurement device according to claim 5, wherein the reference line is a horizontal line or a skyline.

10. The distance measurement device according to claim 6, wherein the reference line is a horizontal line or a skyline.

11. An image capturing control device configured to control an image capturing device, the image capturing control device comprising a calculation unit,
wherein the image capturing device is configured to output a captured image signal by capturing an image including a reference line extending in a horizontal direction and a target object positioned closer to the image capturing device than the reference line, to the calculation unit,
wherein the calculation unit is configured to obtain reference line angle information indicating an angle between a direction from the image capturing device to the reference line and a height direction of the image capturing device,
wherein the calculation unit is configured to obtain height information indicating a height at which the image capturing device is provided, based on the reference line angle information,
wherein the calculation unit is configured to obtain target object angle information indicating an angle between a direction from the image capturing device to the target object and the height direction of the image capturing device, by using the captured image signal, and
wherein the calculation unit is configured to obtain distance information indicating a distance between the image capturing device and the target object, by using the height information, the target object angle information and a value of an earth radius.

12. An image capturing control device configured to control an image capturing device, the image capturing control device comprising a calculation unit,
wherein the image capturing device is configured to output a captured image signal by capturing an image including a reference line extending in a horizontal direction and a target object positioned closer to the image capturing device than the reference line, to the calculation unit,
wherein the calculation unit is configured to obtain position information indicating a position of the target object relative to the reference line, by using the captured image signal,
wherein the calculation unit is configured to obtain target object angle information indicating an angle between a direction from the image capturing device to the target object and a height direction of the image capturing device, by using the position information,
wherein the calculation unit is configured to obtain height information indicating a height at which the image capturing device is provided, and
wherein the calculation unit is configured to obtain distance information indicating a distance between the image capturing device and the target object, by using the height information, the target object angle information and a value of an earth radius.

13. An image capturing system comprising:
an image capturing device; and
a calculation unit,
wherein the image capturing device includes an image capturing unit, wherein the image capturing unit is configured to output a captured image signal by capturing an image including a reference line extending in a horizontal direction and a target object positioned closer to the image capturing unit than the reference line, to the calculation unit, wherein the calculation unit is configured to obtain reference line angle information indicating an angle between a direction from the image capturing unit to the reference line and a height direction of the image capturing unit, by using the captured image signal, wherein the calculation unit is configured to obtain height information indicating a height at which the image capturing unit is provided, based on the reference line angle information, wherein the calculation unit is configured to obtain target object angle information indicating an angle between a direction from the image capturing unit to the target object and the height direction of the image capturing unit, by using the captured image signal, and wherein the calculation unit is configured to obtain distance information indicating a distance between the image capturing unit and the target object, by using the height information, the target object angle information and a value of an earth radius.

14. A moving body comprising:

an image capturing device;

a calculation unit; and a control unit configured to control the moving body based on the distance information, wherein the image capturing device includes an image capturing unit, wherein the image capturing unit is configured to output a captured image signal by capturing an image including a reference line extending in a horizontal direction and a target object positioned closer to the image capturing unit than the reference line, to the calculation unit, wherein the calculation unit is configured to obtain reference line angle information indicating an angle between a direction from the image capturing unit to the reference line and a height direction of the image capturing unit, by using the captured image signal, wherein the calculation unit is configured to obtain height information indicating a height at which the image capturing unit is provided, based on the reference line angle information, wherein the calculation unit is configured to obtain target object angle information indicating an angle between a direction from the image capturing unit to the target object and the height direction of the image capturing unit, by using the captured image signal, and wherein the calculation unit is configured to obtain distance information indicating a distance between the image capturing unit and the target object, by using the height information, the target object angle information and a value of an earth radius.

15. An image capturing method comprising:

outputting a captured image signal by capturing an image including a reference line extending in a horizontal direction and a target object positioned closer to an image capturing unit than the reference line;

obtaining reference line angle information indicating an angle between a direction from the image capturing unit to the reference line and a height direction of the image capturing unit, by using the captured image signal;

obtaining height information indicating a height at which the image capturing unit is provided, based on the reference line angle information;

obtaining target object angle information indicating an angle between a direction from the image capturing unit to the target object and the height direction of the image capturing unit, by using the captured image signal; and obtaining distance information indicating a distance between the image capturing unit and the target object, by using the height information, the target object angle information and a value of an earth radius.

16. A storage medium storing computer-executable instructions that, when executed by a computer, cause the computer to perform an image capturing method comprising:

outputting a captured image signal by capturing an image including a reference line extending in a horizontal direction and a target object positioned closer to an image capturing unit than the reference line;

obtaining reference line angle information indicating an angle between a direction from the image capturing unit to the reference line and a height direction of the image capturing unit, by using the captured image signal;

obtaining height information indicating a height at which the image capturing unit is provided, based on the reference line angle information;

obtaining target object angle information indicating an angle between a direction from the image capturing unit to the target object and the height direction of the image capturing unit, by using the captured image signal; and obtaining distance information indicating a distance between the image capturing unit and the target object, by using the height information, the target object angle information and a value of an earth radius.

* * * * *